US012681424B2

(12) United States Patent
Harada et al.

(10) Patent No.: US 12,681,424 B2
(45) Date of Patent: Jul. 14, 2026

(54) IMAGE FORMING APPARATUS

(71) Applicant: KYOCERA Document Solutions Inc., Osaka (JP)

(72) Inventors: Yuzo Harada, Osaka (JP); Kazuhisa Hirahara, Osaka (JP); Tomohiko Yamakawa, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 19/097,460

(22) Filed: Apr. 1, 2025

(65) Prior Publication Data

US 2025/0321533 A1 Oct. 16, 2025

(30) Foreign Application Priority Data

Apr. 12, 2024 (JP) ................................ 2024-064893

(51) Int. Cl.
*G03G 21/16* (2006.01)
*G03G 15/08* (2006.01)

(52) U.S. Cl.
CPC ..... *G03G 21/1647* (2013.01); *G03G 15/0849* (2013.01); *G03G 15/0853* (2013.01); *G03G 15/0896* (2013.01); *G03G 21/1619* (2013.01); *G03G 21/1652* (2013.01); *G03G 2221/163* (2013.01); *G03G 2221/166* (2013.01)

(58) Field of Classification Search
CPC ........... G03G 15/0849; G03G 15/0853; G03G 15/0896; G03G 21/1619; G03G 21/1647; G03G 21/1652; G03G 21/1676; G03G 2221/163; G03G 2221/1654; G03G 2221/166
See application file for complete search history.

(56) References Cited

U.S. PATENT DOCUMENTS

| | | | | |
|---|---|---|---|---|
| 2017/0285571 | A1* | 10/2017 | Takahashi .......... | G03G 21/1647 |
| 2020/0393789 | A1 | 12/2020 | Ohashi ............... | G03G 21/1647 |
| 2022/0404760 | A1* | 12/2022 | Son .................... | G03G 21/1647 |
| 2024/0345539 | A1* | 10/2024 | Son .................... | G03G 21/1676 |

FOREIGN PATENT DOCUMENTS

JP 2020-201459 A 12/2020

* cited by examiner

*Primary Examiner* — Sophia S Chen
(74) *Attorney, Agent, or Firm* — Stein IP, LLC

(57) ABSTRACT

An image forming apparatus includes a development device and a slide member. The slide member is capable of reciprocating in the longitudinal direction of the development device, and removably supports the development device. The development device and the slide member include a locating pin and a locating hole that are fitted together when the development device and the slide member approach each other. The locating hole includes an opening inclined portion. The locating pin includes: a tip inclined portion; and a locating inclined portion that is continuous in the circumferential direction of the tip inclined portion, is arranged opposite the opening inclined portion in the longitudinal direction of the development device and has a smaller inclination angle than the tip inclined portion.

6 Claims, 11 Drawing Sheets

IMAGE FORMING APPARATUS

INCORPORATION BY REFERENCE

This application is based upon and claims the benefit of priority from the corresponding Japanese Patent Application No. 2024-064893 filed on Apr. 12, 2024, the entire contents of which are incorporated herein by reference.

BACKGROUND

The present disclosure relates to image forming apparatuses.

An image forming apparatus of an electrophotographic system such as a copying machine or a printer includes a development device which supplies a toner to an electrostatic latent image formed on the outer circumferential surface of an image carrying member such as a photosensitive drum, and develops the electrostatic latent image to form a toner image. The image forming apparatus may removably support the development device so that maintenance or replacement is performed on the development device.

SUMMARY

An image forming apparatus according to an aspect of the present disclosure includes an image carrying member, a development device, a slide member, an approach/separation mechanism, a density sensor and a relay board. In the image carrying member, an electrostatic latent image is formed on an outer circumferential surface. The development device includes a developer carrying member which supplies a toner to the electrostatic latent image to form a toner image. The slide member is capable of reciprocating in the longitudinal direction of the development device, and removably supports the development device. The approach/separation mechanism moves the slide member to a support position in which the slide member is located close to the development device and to a separation position in which the slide member is located away from the development device while moving the slide member in the longitudinal direction of the development device. The density sensor is provided in the development device to detect the density of the toner in the development device. The relay board is provided in the slide member and is electrically connectable to the density sensor. Each of the development device and the slide member includes one of a locating pin and a locating hole that are fitted together when the development device and the slide member approach each other. The locating hole includes an opening inclined portion that is provided in an opening end portion and is inclined with respect to the axial direction of the locating hole. The locating pin includes a tip inclined portion and a locating inclined portion. The tip inclined portion is provided in a tip portion of the locating pin and is inclined with respect to the axial direction of the locating pin. The locating inclined portion is continuous in the circumferential direction of the tip inclined portion, is arranged opposite the opening inclined portion in the longitudinal direction of the development device and has a smaller inclination angle with respect to the axial direction than the tip inclined portion.

DETAILED DESCRIPTION

An embodiment of the present disclosure will be described below with reference to drawings. The present disclosure is not limited to details described below.

Figure 1:
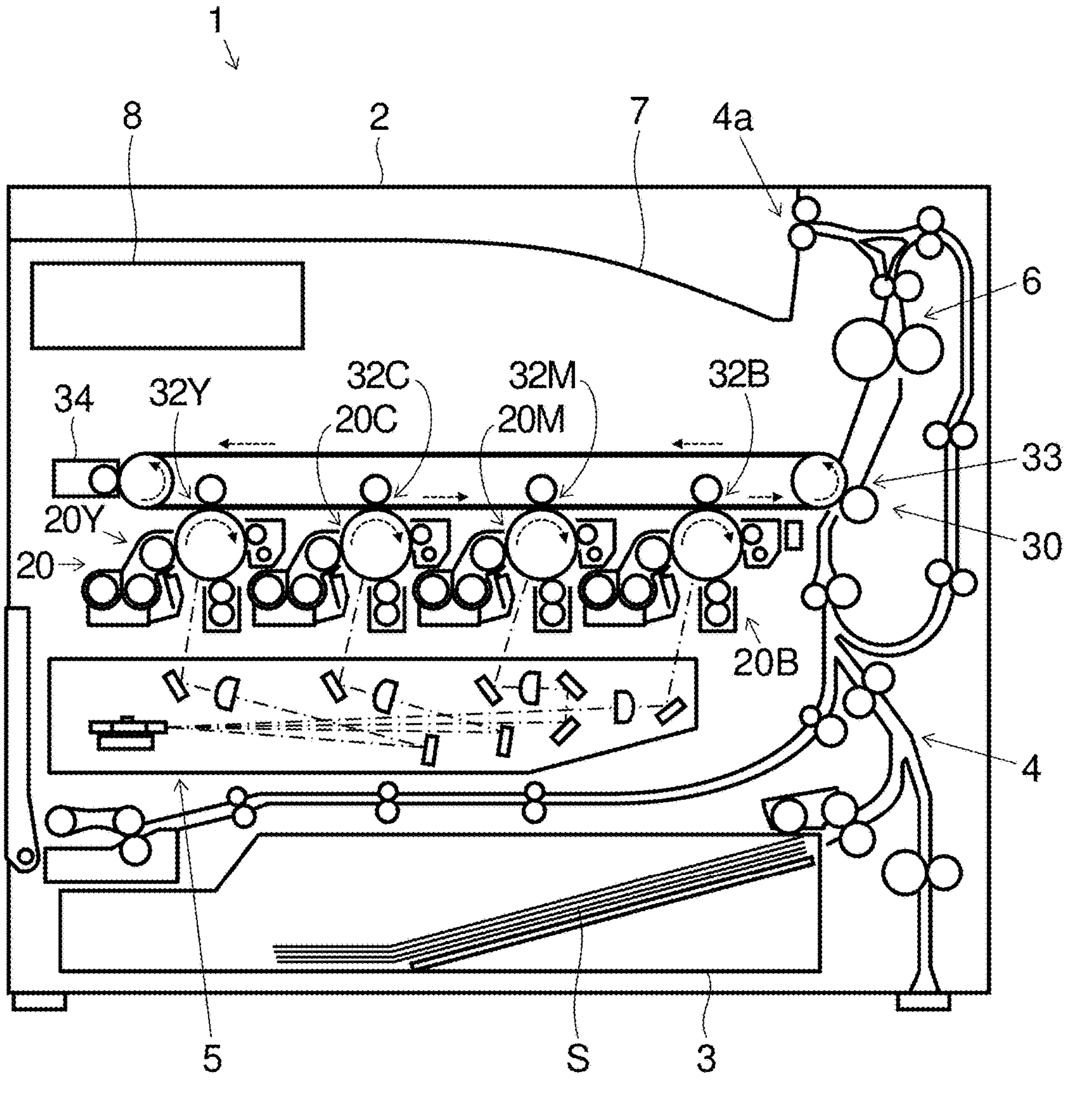
FIG. 1 is a schematic cross-sectional front view of an image forming apparatus according to an embodiment of the present disclosure.
Figure 2:
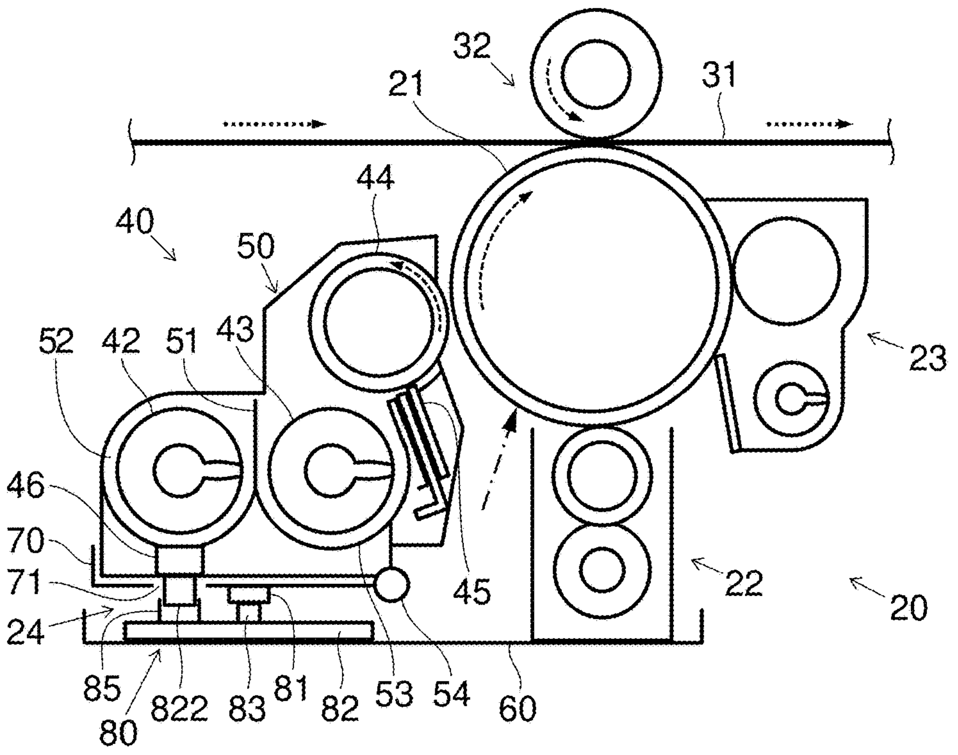
FIG. 2 is a schematic cross-sectional front view of an area around an image formation unit included in the image forming apparatus in FIG. 1, and shows a state where a development device is arranged in a development position.
Figure 3:
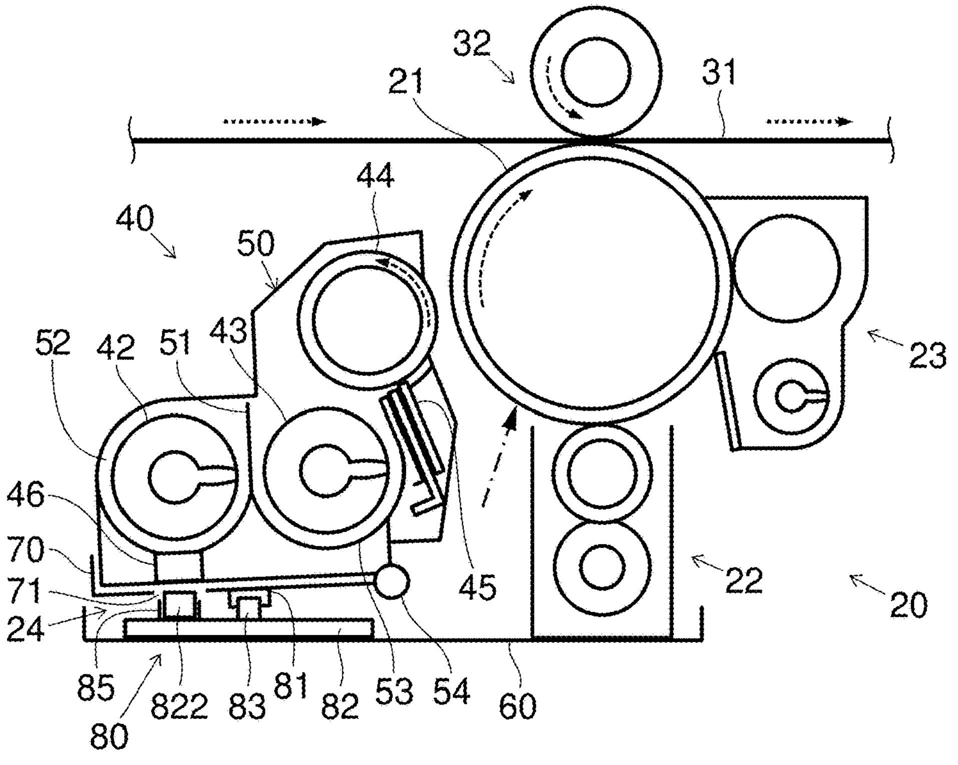
FIG. 3 is a schematic cross-sectional front view of the area around the image formation unit included in the image forming apparatus in FIG. 1, and shows a state where the development device is arranged in a retraction position.

FIG. 1 is a schematic cross-sectional front view of an image forming apparatus 1 according to the embodiment. FIGS. 2 and 3 are schematic cross-sectional front views of an area around an image formation unit 20 included in the image forming apparatus 1 in FIG. 1, and show a state where a development device is arranged in a development position and a state where the development device is arranged in a retraction position. An example of the image forming apparatus 1 according to the present embodiment is a tandem type color printer which uses an intermediate transfer belt 31 to transfer a toner image to a sheet S. The image forming apparatus 1 may be, for example, a so-called multifunctional peripheral which has the functions of printing, scanning (image reading), fax transmission and the like.

As shown in FIGS. 1 to 3, the image forming apparatus 1 includes a sheet supply unit 3, a sheet conveyance unit 4, an exposure unit 5, the image formation units 20, a transfer unit 30, a fixing unit 6, a sheet ejection unit 7 and a control unit 8 which are provided in the main body 2 thereof.

The sheet supply unit 3 is arranged in a bottom portion of the main body 2. The sheet supply unit 3 stores a plurality of sheets S before printing, and feeds out the sheets S one by one during printing. The sheet conveyance unit 4 extends along a side wall of the main body 2 in an up/down direction. The sheet conveyance unit 4 conveys the sheet S fed from the sheet supply unit 3 to a secondary transfer unit 33 and the fixing unit 6, and further ejects the sheet S after fixing from a sheet ejection port 4*a* to the sheet ejection unit 7.

The exposure unit 5 is arranged above the sheet supply unit 3. The exposure unit 5 applies laser light controlled based on image data toward the image formation units 20.

The image formation units 20 are arranged above the exposure unit 5 and below the intermediate transfer belt 31. The image formation units 20 include an image formation unit 20Y for yellow, an image formation unit 20C for cyan, an image formation unit 20M for magenta and an image formation unit 20B for black. These four image formation units 20 have the same basic configuration. Hence, in the following description, the identification symbols “Y”, “C”, “M” and “B” representing the colors may be omitted unless otherwise specified.

The image formation unit 20 includes a photosensitive drum (image carrying member) 21 which is supported rotatably in a predetermined direction (clockwise in FIGS. 1 and 2). The image formation unit 20 further includes a charging unit 22, a development device 40 and a drum cleaning unit 23 which are arranged around the photosensitive drum 21 along the rotation direction thereof. A primary transfer unit 32 is arranged between the development device 40 and the drum cleaning unit 23.

The photosensitive drum 21 is formed in the shape of a cylinder which extends in a horizontal direction, and includes a photosensitive layer formed of, for example, an amorphous silicon photosensitive member. The charging unit 22 charges the surface (outer circumferential surface) of the photosensitive drum 21 to a predetermined potential. The exposure unit 5 exposures the outer circumferential surface of the photosensitive drum 21 charged by the charging unit 22 to form an electrostatic latent image of an original image. The development device 40 supplies a toner to the electrostatic latent image, and develops the electrostatic latent image to form a toner image. The four image formation units 20 form toner images of different colors. The drum cleaning unit 23 performs cleaning by removing the toner and the like left on the outer circumferential surface of the photosensitive drum 21 after the toner image is primarily transferred to the outer circumferential surface of the intermediate transfer belt 31. In this way, the image formation unit 20 forms an image (toner image) which will be transferred to the sheet S later.

The transfer unit 30 includes the intermediate transfer belt 31, primary transfer units 32Y, 32C, 32M and 32B, the secondary transfer unit 33 and a belt cleaning unit 34. The intermediate transfer belt 31 is arranged above the four image formation units 20. The intermediate transfer belt 31 is a seamless intermediate transfer member which is supported rotatably in a predetermined direction (counterclockwise in FIG. 1) and onto which the toner images formed by the four image formation units 20 are superimposed and primarily transferred in a sequential manner. The four image formation units 20 are arranged in a so-called tandem system in which they are aligned from an upstream side to a downstream side in the rotation direction of the intermediate transfer belt 31.

The primary transfer units 32Y, 32C, 32M and 32B are arranged above the image formation units 20Y, 20C, 20M and 20B through the intermediate transfer belt 31. The secondary transfer unit 33 is arranged on the upstream side of the fixing unit 6 in the sheet conveyance direction of the sheet conveyance unit 4 and on the downstream side of the four image formation units 20Y, 20C, 20M and 20B in the rotation direction of the intermediate transfer belt 31. The belt cleaning unit 34 is arranged on the downstream side of the secondary transfer unit 33 in the rotation direction of the intermediate transfer belt 31.

The primary transfer unit 32 transfers the toner image formed on the outer circumferential surface of the photosensitive drum 21 to the intermediate transfer belt 31. In other words, the toner images are primarily transferred to the outer circumferential surface of the intermediate transfer belt 31 in the primary transfer units 32Y, 32C, 32M and 32B of the colors. Then, the toner images of the four image formation units 20 are continuously superimposed and transferred onto the intermediate transfer belt 31 together with the rotation of the intermediate transfer belt 31 at a predetermined timing, and thus a color toner image obtained by superimposing the toner images of the four colors of yellow, cyan, magenta and black is formed on the outer circumferential surface of the intermediate transfer belt 31.

The color toner image on the outer circumferential surface of the intermediate transfer belt 31 is transferred to the sheet S fed in synchronization by the sheet conveyance unit 4 in a secondary transfer nip portion formed in the secondary transfer unit 33. The belt cleaning unit 34 performs cleaning by removing adhered substances such as the toner left on the outer circumferential surface of the intermediate transfer belt 31 after the secondary transfer. In this way, the transfer unit 30 transfers (records) the toner image formed on the outer circumferential surface of the photosensitive drum 21 to the sheet S.

The fixing unit 6 is arranged above the secondary transfer unit 33. The fixing unit 6 heats and pressurizes the sheet S to which the toner images have been transferred to fix the toner images to the sheet S.

The sheet ejection unit 7 is arranged above the transfer unit 30. The sheet S in which the toner images have been fixed and thus printing has been completed is conveyed to the sheet ejection unit 7. In the sheet ejection unit 7, the sheet (printed product) is taken out from above.

The control unit 8 includes a CPU, an image processing unit, a storage unit and other electronic circuits and electronic components (which are not shown). The CPU controls, based on control programs and data stored in the storage unit, the operations of constituent elements provided in the image forming apparatus 1 to perform processing corresponding to the functions of the image forming apparatus 1. The sheet supply unit 3, the sheet conveyance unit 4, the exposure unit 5, the image formation units 20, the transfer unit 30 and the fixing unit 6 individually receive commands from the control unit 8 to perform printing on the sheet S in conjunction with each other. The storage unit is, for example, a combination of nonvolatile storage devices such as a program ROM (Read Only Memory) and a data ROM and volatile storage devices such as a RAM (Random Access Memory).

The configuration of the development device 40 will then be described with reference to FIGS. 2 and 3. Since the development devices 40 of the colors have the same basic configuration, the identification symbols representing the colors of the constituent elements and the descriptions thereof are omitted. In the description, the “axial direction” indicates the axial direction (direction of depth of each of the planes of FIGS. 2 and 3) of the rotation of each of the photosensitive drum 21, a first conveyance member 42, a second conveyance member 43 and a development roller 44 which extend parallel to each other.

The development device 40 supplies the toner to the outer circumferential surface of the photosensitive drum 21. The development device 40 is removable with respect to, for example, the main body 2 of the image forming apparatus 1. The development device 40 includes a development container 50, the first conveyance member 42, the second conveyance member 43, the development roller (developer carrying member) 44, a restriction blade 45 and a density sensor 46.

The development container 50 is in an elongated shape extending along the axial direction of the photosensitive drum 21, and is arranged with its longitudinal direction being horizontal. In other words, the longitudinal direction of the development container 50 is parallel to the axial direction of the photosensitive drum 21. The development container 50 stores, for example, a two-component developer including the toner and a magnetic carrier as a developer including the toner supplied to the photosensitive drum 21.

The development container 50 includes a partition portion 51, a first conveyance chamber 52, a second conveyance chamber 53, a pair of communication portions (not shown) and a pair of development support shafts 54.

The partition portion 51 is provided in a lower portion of the interior of the development container 50. The partition portion 51 is arranged substantially in a center portion in a direction intersecting the longitudinal direction of the development container 50 (left/right direction in FIGS. 2 and 3). The partition portion 51 is formed substantially in the shape of a plate which extends in the longitudinal direction and the up/down direction of the development container 50. The partition portion 51 partitions the interior of the development container 50 in the direction intersecting the longitudinal direction.

The first conveyance chamber 52 and the second conveyance chamber 53 are provided inside the development container 50. The first conveyance chamber 52 and the second conveyance chamber 53 are formed by partitioning the interior of the development container 50 with the partition portion 51. The first conveyance chamber 52 and the second conveyance chamber 53 are arranged side by side substantially at the same height.

The second conveyance chamber 53 includes an area around the region of the arrangement of the development roller 44 in the development container 50, and is arranged adjacent to the photosensitive drum 21. The first conveyance chamber 52 is arranged in a region in the development container 50 which is farther away from the photosensitive drum 21 than the second conveyance chamber 53. In the first conveyance chamber 52, a developer supply port (not shown) is opened, and the developer is supplied into the development container 50 via the developer supply port. In the first conveyance chamber 52, the first conveyance member 42 conveys the developer from the back side of the development container 50 toward the front side (in a direction from the back side in the direction of depth of each of the planes of FIGS. 2 and 3 to the front). In the second conveyance chamber 53, the second conveyance member 43 conveys the developer from the front side of the development container 50 toward the back side (in a direction from the front side in the direction of depth of each of the planes of FIGS. 2 and 3 to the back).

The pair of communication portions are arranged on the outer sides of both end portions in the longitudinal direction of the partition portion 51. The communication portions cause the first conveyance chamber 52 to communicate with the second conveyance chamber 53 in a direction intersecting the longitudinal direction of the partition portion 51 (left/right direction in FIGS. 2 and 3), that is, in the direction of thickness of the partition portion 51 which is formed substantially in the shape of a plate. The pair of communication portions cause the first conveyance chamber 52 to communicate with the second conveyance chamber 53 on each of the sides of both end portions of the first conveyance chamber 52 and the second conveyance chamber 53 in the longitudinal direction. In the communication portion on the downstream end of the first conveyance chamber 52 in a developer conveyance direction, the developer is conveyed from the side of the first conveyance chamber 52 toward the side of the second conveyance chamber 53. In the communication portion on the downstream end of the second conveyance chamber 53 in the developer conveyance direction, the developer is conveyed from the side of the second conveyance chamber 53 toward the side of the first conveyance chamber 52.

The first conveyance member 42 is arranged in the first conveyance chamber 52. The second conveyance member 43 is arranged in the second conveyance chamber 53. The first conveyance member 42 and the second conveyance member 43 are arranged side by side substantially at the same height. The second conveyance member 43 extends parallel to the development roller 44 near the development roller 44. Each of the first conveyance member 42 and the second conveyance member 43 is supported to the development container 50 rotatably around an axis extending parallel to the development roller 44 in the horizontal direction.

The first conveyance member 42 and the second conveyance member 43 have the same basic configuration. Each of the first conveyance member 42 and the second conveyance member 43 includes a spiral conveyance blade on the outer circumferential portion of a rotation shaft extending along the longitudinal direction of the development container 50. The first conveyance member 42 conveys, while stirring the developer, the developer from the back side to the front side of the development container 50 along the axial direction of the rotation in the first conveyance chamber 52. The second conveyance member 43 conveys, while stirring the developer, the developer from the front side to the back side of the development container 50 along the axial direction of the rotation in the second conveyance chamber 53. In other words, each of the first conveyance member 42 and the second conveyance member 43 conveys, while stirring the developer, the developer in a direction opposite to the longitudinal direction thereof to circulate the developer in a predetermined circulation direction.

The development roller 44 is arranged above the second conveyance member 43 in the development container 50, and is arranged opposite the photosensitive drum 21. The development roller 44 is supported to the development container 50 rotatably around an axis extending parallel to the axis of the photosensitive drum 21.

A part of the outer circumferential surface of the development roller 44 is exposed from the development container 50, is opposite the photosensitive drum 21 and is located close to the photosensitive drum 21. The development roller 44 carries, in a region opposite the photosensitive drum 21, the toner to be supplied to the outer circumferential surface of the photosensitive drum 21 on the outer circumferential surface of the development roller 44. The development roller 44 carries the toner in the second conveyance chamber 53 of the development container 50, and supplies the toner to the photosensitive drum 21. In other words, the development roller 44 adheres the toner in the second conveyance chamber 53 to the electrostatic latent image on the outer circumferential surface of the photosensitive drum 21 to form the toner image.

The restriction blade 45 is arranged on the upstream side in the rotation direction of the development roller 44 with respect to the opposite region of the development roller 44 and the photosensitive drum 21. The restriction blade 45 is opposite the development roller 44 near the development roller 44, and is arranged with a predetermined distance provided between its tip and the outer circumferential surface of the development roller 44. The restriction blade 45 extends over the entire region of the development roller 44 in the axial direction thereof. The restriction blade 45 restricts the thickness of the layer of the developer which passes through a gap between the tip of the restriction blade 45 and the outer circumferential surface of the development roller 44 and is carried on the outer circumferential surface of the development roller 44.

The density sensor 46 is arranged on the bottom portion of a wall portion along the longitudinal direction of the first conveyance chamber 52. The density sensor 46 is arranged opposite the first conveyance member 42. In the present embodiment, as the density sensor 46, a headless sensor is used. In the density sensor 46 which is the headless sensor, its detection surface is embedded in the inner wall surface of the first conveyance chamber 52. In other words, the density sensor 46 is provided in the development device 40 to detect the density of the toner in the developer inside the development device 40.

Specifically, the density sensor 46 is a magnetic permeability detection-type sensor which obtains a toner density (the mixing ratio of a toner T to a carrier C in a developer; T/C) by detecting a change in the magnetic permeability of a two-component developer. When the ratio of the toner to the carrier in the developer inside the first conveyance chamber 52 is changed, the magnetic permeability is changed, and the output signal of the density sensor 46 is changed accordingly. The control unit 8 controls, based on the output signal of the sensor received from the density sensor 46, the start and the stop of the supply of the developer (the toner and the carrier) to the development device 40.

By the rotation of the first conveyance member 42 and the second conveyance member 43, the developer in the development container 50 is passed through the communication portions, and is circulated in the predetermined circulation direction between the first conveyance chamber 52 and the second conveyance chamber 53. Here, the toner in the development container 50 is stirred and charged to be carried on the outer circumferential surface of the development roller 44. The thickness of the layer of the developer carried on the outer circumferential surface of the development roller 44 is restricted by the restriction blade 45, and then the developer is conveyed to the opposite region of the development roller 44 and the photosensitive drum 21 by the rotation of the development roller 44. When a predetermined development voltage is applied to the development roller 44, a potential difference with the potential of the surface (outer circumferential surface) of the photosensitive drum 21 causes the toner in the developer carried on the outer circumferential surface of the development roller 44 to move to the outer circumferential surface of the photosensitive drum 21 in the opposite region. In this way, the electrostatic latent image on the outer circumferential surface of the photosensitive drum 21 is developed by the toner.

The pair of development support shafts 54 are arranged in a bottom portion of the development container 50 and on the side of the photosensitive drum 21 in the direction intersecting the longitudinal direction (left/right direction in FIGS. 2 and 3). Each of the pair of development support shafts 54 extends toward the front side and the back side of the development container 50 along the longitudinal direction (the axial direction, the direction of depth of each of the planes of FIGS. 2 and 3).

The development container 50 (development device 40) is supported to be swingable around the axis of the pair of development support shafts 54 with respect to a support frame 60 which will be described later. The development device 40 is swingable around the axis of the pair of development support shafts 54 to a development position (see FIG. 2) in which the development roller 44 is located close to the photosensitive drum 21 and to a retraction position (see FIG. 3) in which the development roller 44 is located away from the photosensitive drum 21.

Figure 4:
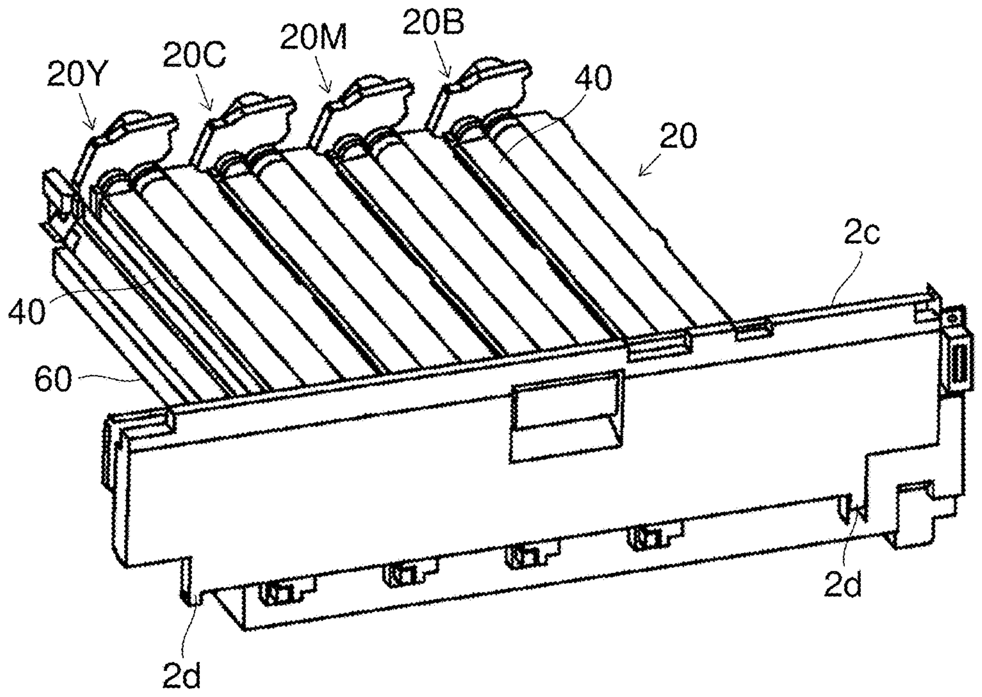
FIG. 4 is a perspective view showing the arrangement of four image formation units in FIG. 1.
Figure 5:
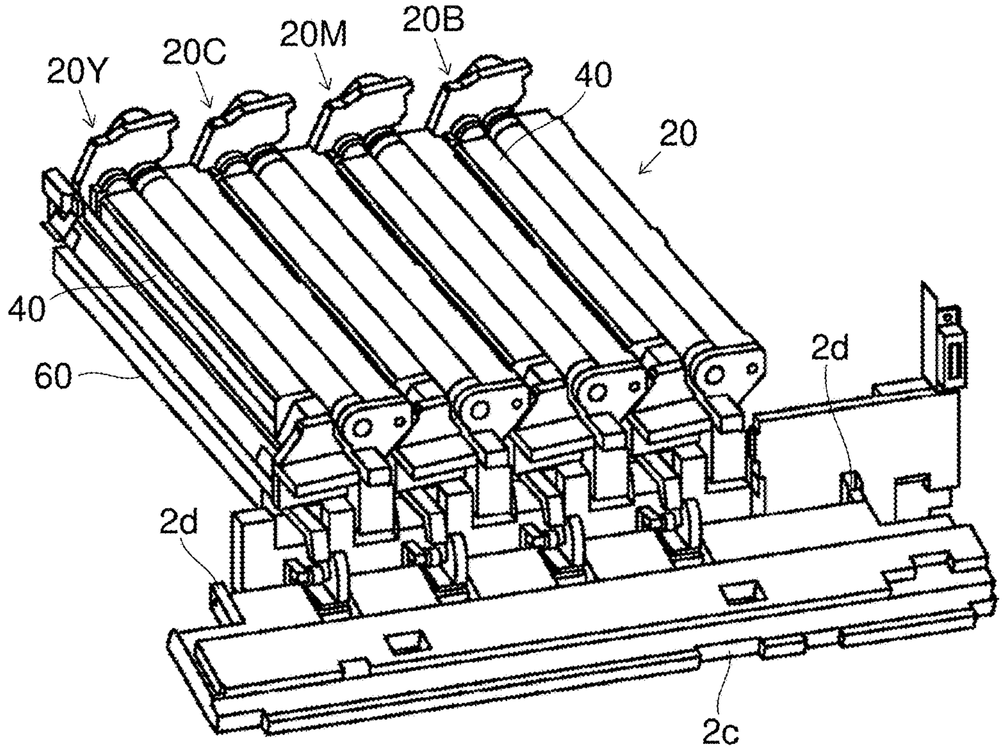
FIG. 5 is a perspective view showing the arrangement of the four image formation units in FIG. 4 and shows a state where an open/close cover is opened.
Figure 6:
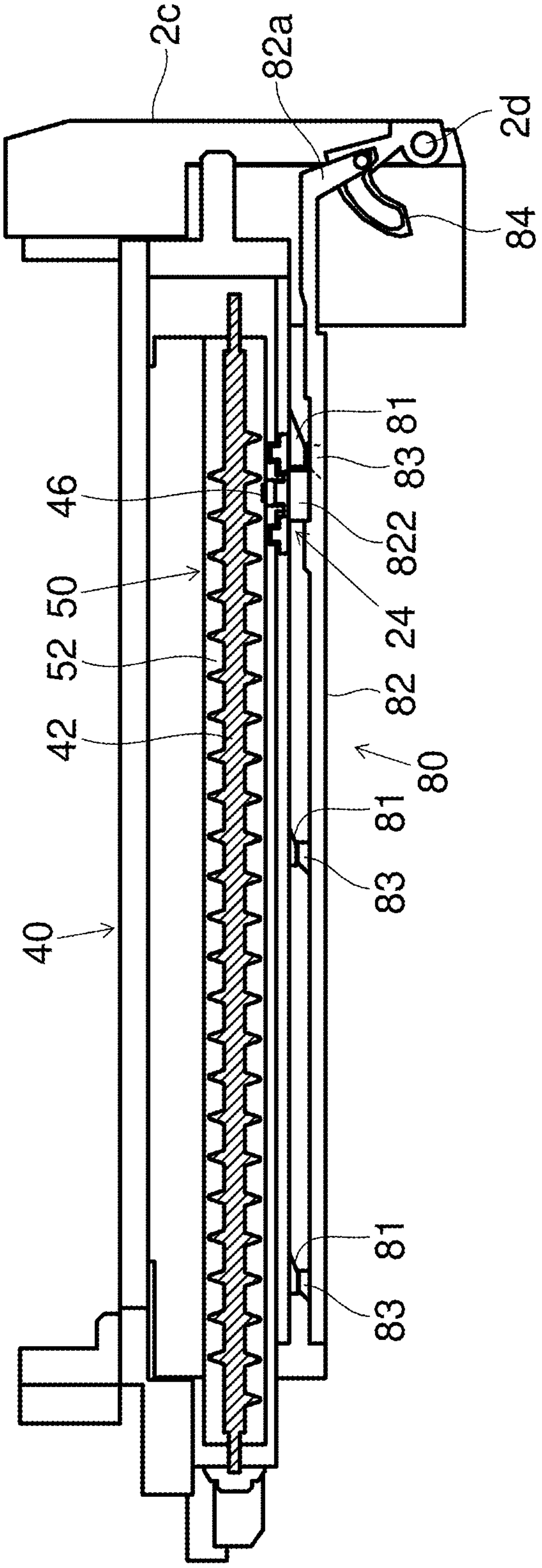
FIG. 6 is a vertical cross-sectional side view of the image formation unit in FIG. 4.
Figure 7:
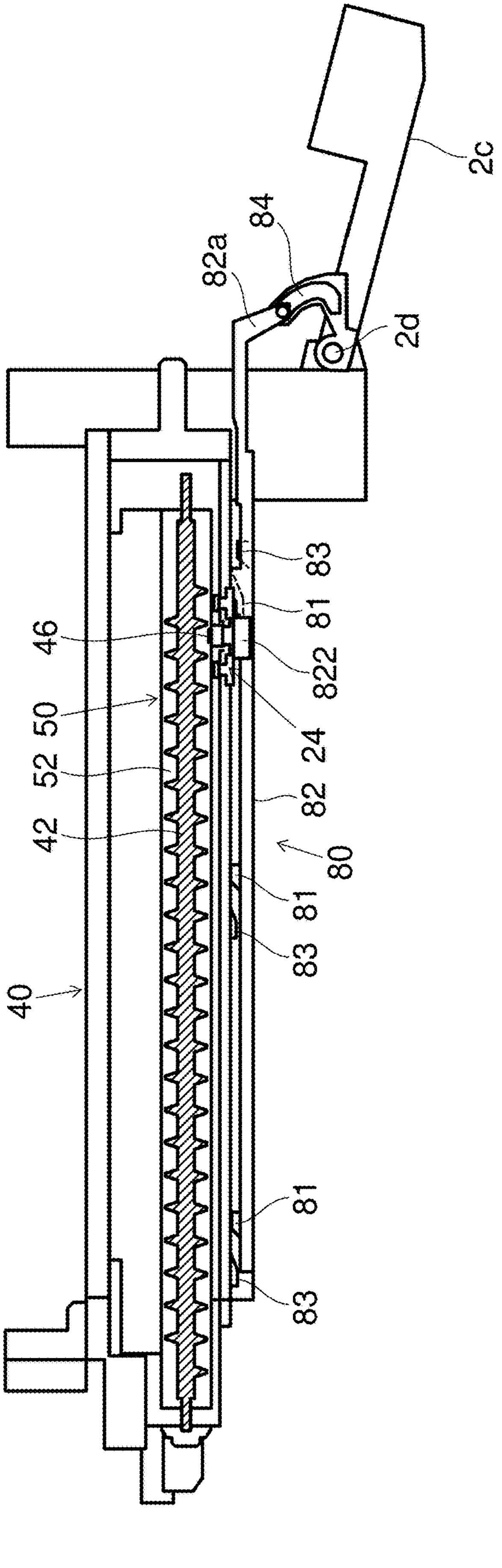
FIG. 7 is a vertical cross-sectional side view of the image formation unit in FIG. 6, and shows the state where the open/close cover is opened.

FIG. 4 is a perspective view showing the arrangement of the four image formation units 20 in FIG. 1. FIG. 5 is a perspective view showing the arrangement of the four image formation units 20 in FIG. 4 and shows a state where an open/close cover 2*c* is opened. FIG. 6 is a vertical cross-sectional side view of the image formation unit 20 in FIG. 4. FIG. 7 is a vertical cross-sectional side view of the image formation unit 20 in FIG. 6, and shows the state where the open/close cover 2*c* is opened. As shown in FIGS. 4 to 7, the image forming apparatus 1 includes the open/close cover 2*c* and the support frames 60.

The open/close cover 2*c* is arranged on the front side of the four image formation units 20. On the front side of the open/close cover 2*c*, the exterior cover (not shown) of the main body 2 of the image forming apparatus 1 is provided. The open/close cover 2*c* is supported rotatably in the up/down direction with respect to the main body 2 while hinge portions 2*d* which are provided at a lower end portion and extend horizontally in the left/right direction are being used as support points. The open/close cover 2*c* opens and closes an opening provided on the front side of the four image formation units 20. The open/close cover 2*c* is opened, and thus the development device 40 can be inserted and removed from the front side of the image forming apparatus 1 through the opening.

The support frames 60 are respectively arranged below the four image formation units 20. The support frames 60 are arranged opposite the image formation units 20 in the up/down direction. The support frames 60 individually and removably support the development devices 40 of the four image formation units 20. The support frame 60 includes a development holder 70 and an approach/separation mechanism 80.

The development holders 70 are respectively arranged below the four development devices 40. The development holder 70 is supported to be swingable, via the shaft (not shown) of the same axis as that of the pair of the development support shafts 54 of the development container 50, around the axis of the shaft with respect to the support frame 60. The development holder 70 extends in a forward/backward direction and the left/right direction below the development container 50. The development holder 70 holds the development device 40.

The approach/separation mechanism 80 is arranged below the development holder 70 of each of the four development devices 40. The approach/separation mechanism 80 moves the development device 40 to the development position in which the development roller 22 is located close to the photosensitive drum 21 and to the retraction position in which the development roller 44 is located away from the photosensitive drum 21. The approach/separation mechanism 80 includes an upper projection portion 81, a slide member 82, a lower projection portion 83 and a link member 84.

The upper projection portion 81 is provided on the lower surface of the development holder 70. The upper projection portion 81 projects downward from the lower surface of the development holder 70. The approach/separation mechanism 80 includes a plurality of upper projection portions 81. In the present embodiment, three upper projection portions 81 are spaced in the forward/backward direction (left/right direction in FIGS. 6 and 7). The upper projection portion 81 is substantially in the shape of a rectangular parallelepiped, and includes a flat upper surface and an inclined surface at the front thereof which is inclined downward from the front side toward the back side.

The slide member 82 is arranged below the development holder 70 (development device 40). The slide member 82 is arranged opposite the development holder 70 in the up/down direction. The slide member 82 extends in the forward/backward direction and the left/right direction below the development holder 70. The slide member 82 is guided by a guide portion (not shown) which is provided in the support frame 60 to extend along the longitudinal direction (the forward/backward direction, the left/right direction in FIGS. 6 and 7) of the development device 40, and is capable of reciprocating in the longitudinal direction of the development device 40. The slide members 82 individually and removably support the development devices 40 of the four image formation units 20. The front end portion **82*a* of the slide member 82 is bent downward substantially in the shape of the letter L, and is coupled to the link member 84**.

The lower projection portion 83 is provided on the upper surface of the slide member 82. The lower projection portion 83 projects upward from the upper surface of the slide member 82. The lower projection portion 83 is arranged opposite the upper projection portion 81 in the up/down direction. In other words, the approach/separation mechanism 80 includes a plurality of lower projection portions 83 the number of which is the same as the number of upper projection portions 81. In the present embodiment, three lower projection portions 83 are spaced in the forward/backward direction (left/right direction in FIGS. 6 and 7). The lower projection portion 83 is substantially in the shape of a rectangular parallelepiped, and includes a flat upper surface and an inclined surface at the back thereof which is inclined upward from the back side toward the front side.

The link member 84 is provided in the open/close cover **2*c*, and projects toward the side of the development device 40 on the back side. The front end portion 82*a* of the slide member 82 is coupled to the link member 84. The link member 84 causes the slide member 82 to reciprocate in the forward/backward direction (the longitudinal direction of the development device 40, the left/right direction in FIGS. 6 and 7) in conjunction with the movement of the open/close cover 2*c*. Specifically, as shown in FIG. 7, when the open/close cover 2*c* is opened, the slide member 82 is moved forward (to the front side). As shown in FIG. 6, when the open/close cover 2*c* is closed, the slide member 82** is moved backward (to the back side).

In a state (see FIG. 6) where the open/close cover **2*c* is closed, the slide member 82 is located in the rearmost position, and the upper projection portion 81 rides on the lower projection portion 83. In this way, the slide member 82 pushes up the development device 40 around the axis of the development support shafts 54 via the development holder 70 to move the development device 40 to the development position (see FIG. 2**).

When the open/close cover **2*c* is opened to a predetermined position (see FIG. 7), the slide member 82 is moved forward relative to the position shown in FIG. 6, and thus the upper projection portion 81 slides down the inclined surface of the lower projection portion 83 to move away from the lower projection portion 83. In this way, the slide member 82 pulls down the development device 40 around the axis of the development support shafts 54 via the development holder 70 to move the development device 40 to the retraction position (see FIG. 3**).

As described above, the approach/separation mechanism 80 moves the development device 40 to the development position in which the development roller 44 is located close to the photosensitive drum 21 and to the retraction position in which the development roller 44 is located away from the photosensitive drum 21 while moving the slide member 82 in the longitudinal direction (forward/backward direction) of the development device 40.

Figure 8:
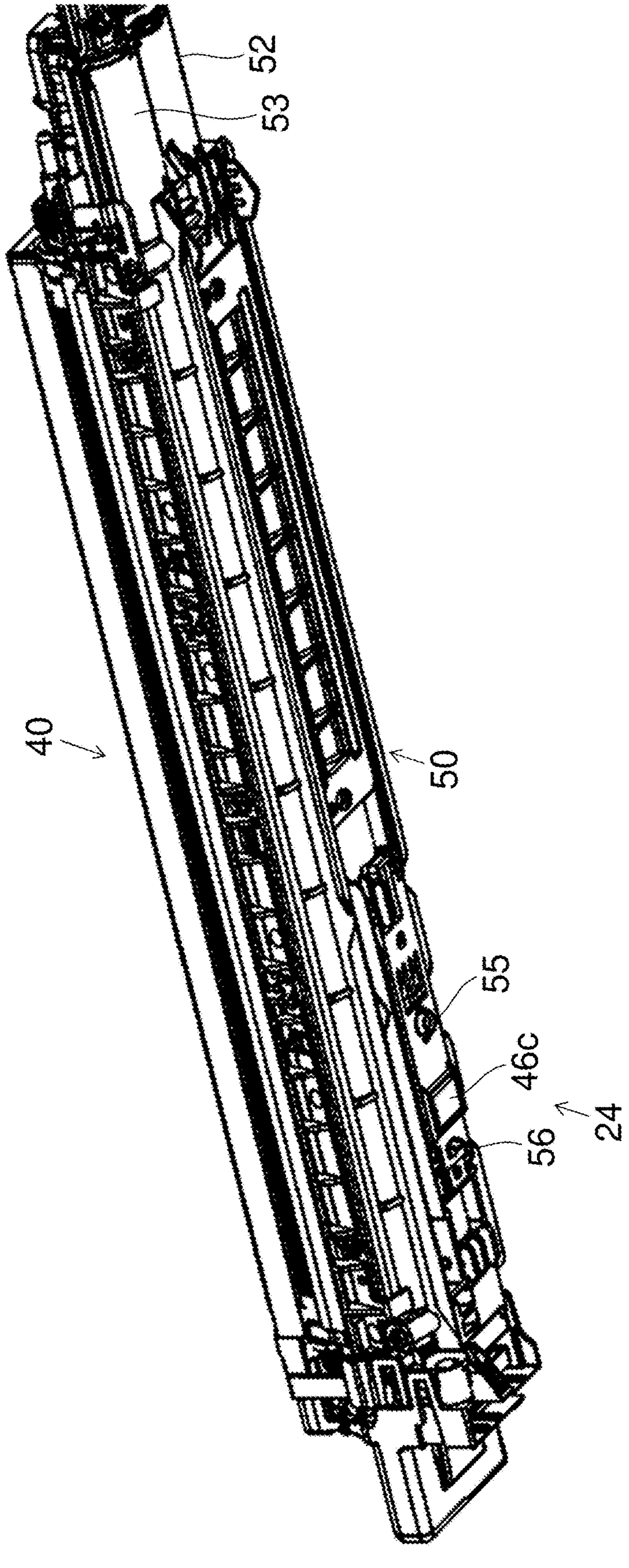
FIG. 8 is a perspective view when the development device in FIG. 4 is viewed from below.
Figure 9:
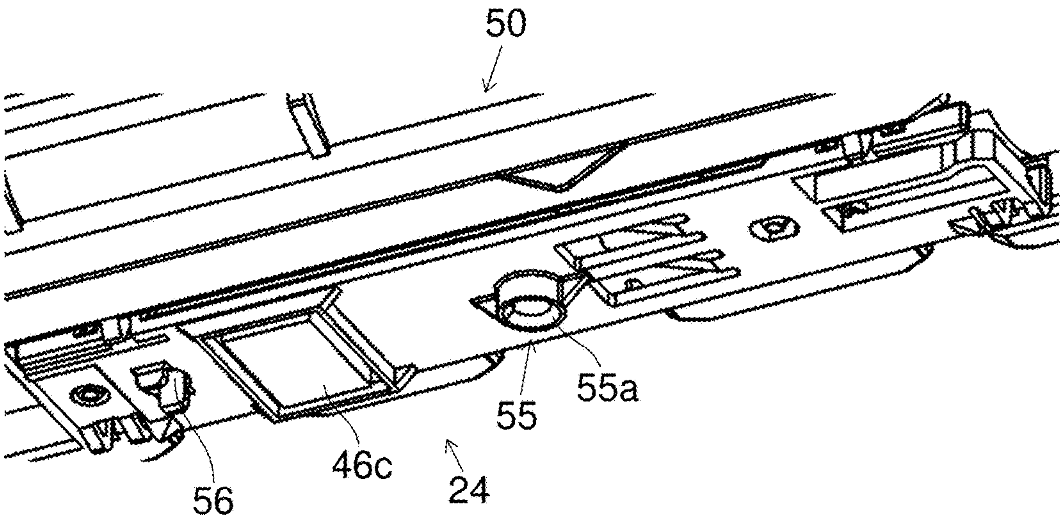
FIG. 9 is a partial enlarged perspective view of an area around the density sensor of the development device in FIG. 8.
Figure 10:
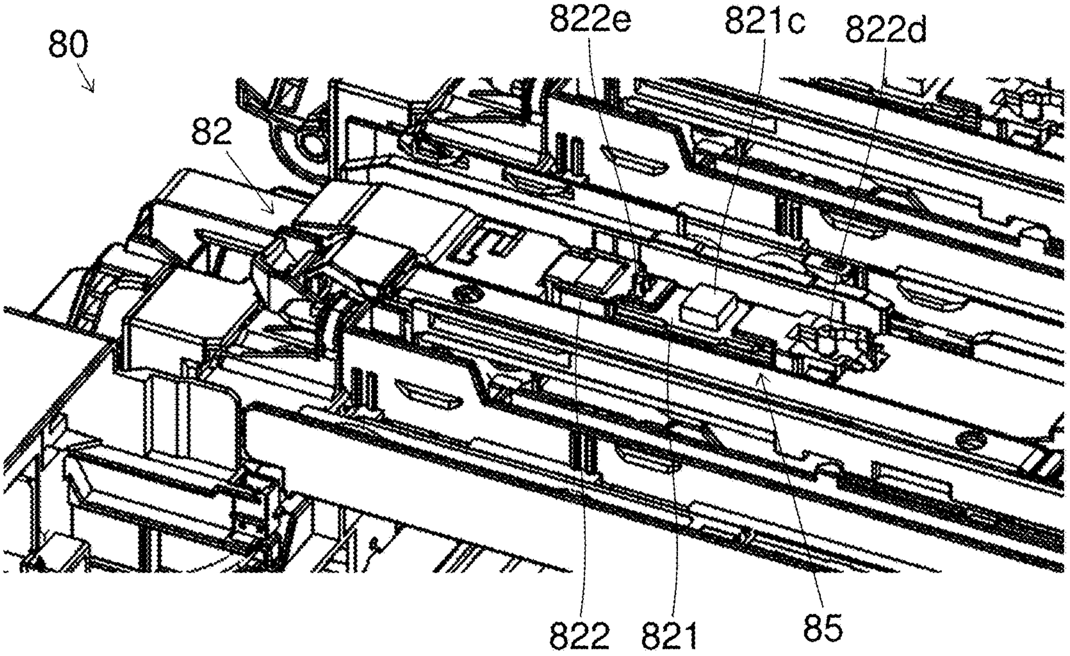
FIG. 10 is a partial perspective view when the slide member of the image formation unit in FIG. 4 is viewed from above.
Figure 11:
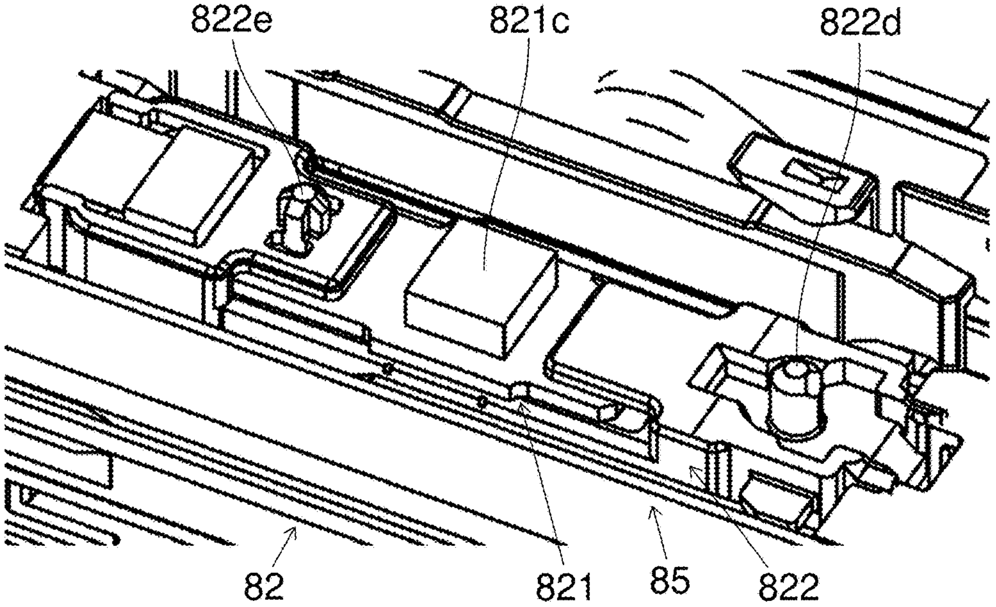
FIG. 11 is a partial enlarged perspective view of an area around the relay board of the slide member in FIG. 10.
Figure 12:
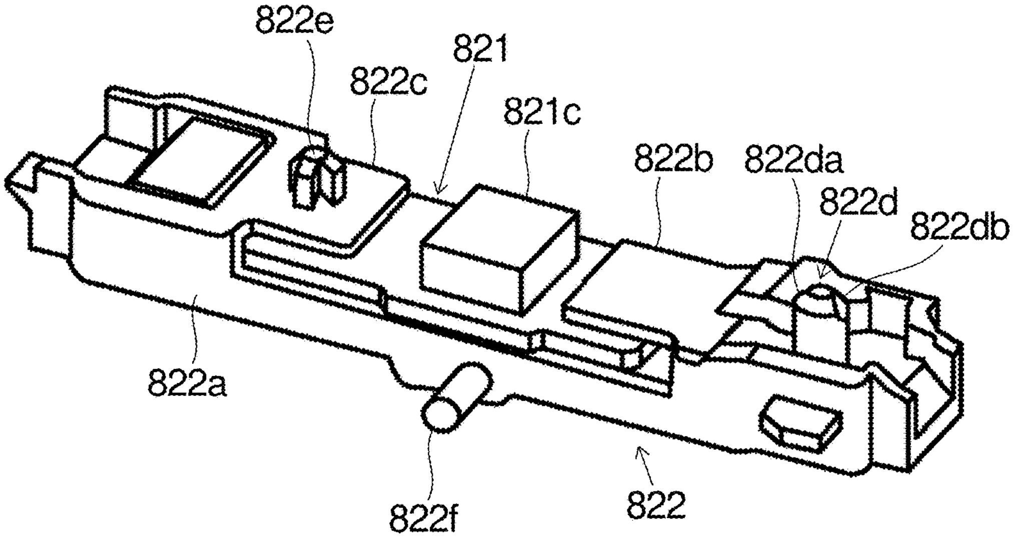
FIG. 12 is a perspective view of the relay board and a board holder in FIG. 11.
Figure 13:
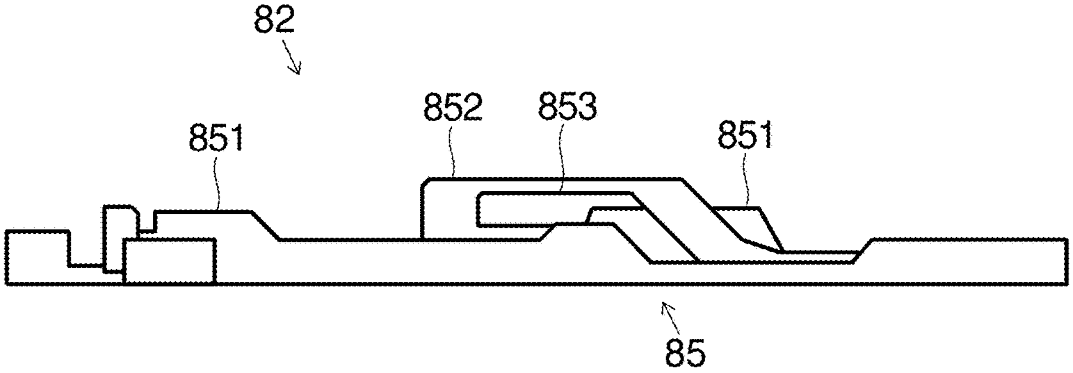
FIG. 13 is a side view of the holder support portion of the slide member in FIG. 11.

A configuration related to the electrical connection of the density sensor 46 will then be described. FIG. 8 is a perspective view when the development device 40 in FIG. 4 is viewed from below. FIG. 9 is a partial enlarged perspective view of an area around the density sensor 46 of the development device 40 in FIG. 8. FIG. 10 is a partial perspective view when the slide member 82 of the image formation unit 20 in FIG. 4 is viewed from above. FIG. 11 is a partial enlarged perspective view of an area around the relay board 821 of the slide member 82 in FIG. 10. FIG. 12 is a perspective view of the relay board 821 and a board holder 822 in FIG. 11. FIG. 13 is a side view of the holder support portion 85 of the slide member 82 in FIG. 11.

As shown in FIGS. 8 to 11, the image formation unit 20 includes a connection portion 24 for performing energization and signal communication on the density sensor 46 of the development device 40. The connection portion 24 is provided below the density sensor 46 of the development container 50. In the connection portion 24, the slide member 82 includes the relay board 821, the board holder 822 and the holder support portion 85. In other words, the image formation unit 20 includes the connection portion 24 of the density sensor 46 and the relay board 821. The development holder 70 includes, in the location of the connection portion 24, an opening 71 through which constituent elements related to the electrical connection of the density sensor 46 are passed.

In the connection portion 24, the development container 50 includes a sensor connector portion **46*c*, a locating hole 55 and a rotation restriction hole 56**.

The sensor connector portion **46*c* is arranged on a bottom portion of the first conveyance chamber 52 of the development container 50. The sensor connector portion 46*c* projects downward with respect to the density sensor 46. The sensor connector portion 46***c* is electrically connected to the board connector portion 821*c* of the relay board 821 which will be described later.

The locating hole 55 is arranged behind (on the back side of) the sensor connector portion 46*c* in the longitudinal direction (forward/backward direction) of the development device 40. The locating hole 55 is cylindrical in shape, opens to the lower surface of the first conveyance chamber 52 of the development container 50 and is recessed upward. A locating pin 822*d* which will be described later is inserted into the locating hole 55 to be fitted thereinto.

The rotation restriction hole 56 is arranged in front of (on the front side of) the sensor connector portion 46*c* in the longitudinal direction (forward/backward direction) of the development device 40. The rotation restriction hole 56 is a long hole extending in the forward/backward direction in cross section, opens to the lower surface of the first conveyance chamber 52 of the development container 50 and is recessed upward. A rotation restriction pin 822*e* which will be described later is inserted into the rotation restriction hole 56 to be fitted thereinto.

The relay board 821 includes the board connector portion 821*c*. The board connector portion 821*c* is arranged on the upper surface of the relay board 821, and projects upward. The board connector portion 821*c* is electrically connected to the sensor connector portion 46*c* of the density sensor 46. In other words, the relay board 821 is provided in the slide member 82, and can be electrically connected to the density sensor 46.

The board holder 822 is a frame-shaped member which extends in the longitudinal direction (forward/backward direction) of the development device 40, and holds the relay board 821. The board holder 822 is movably supported to the holder support portion 85 of the slide member 82. The board holder 822 includes a pair of side plates 822*a*, a front upper plate 822*b*, a back upper plate 822*c*, the locating pin 822*d*, the rotation restriction pin 822*e* and a pair of coupling shafts 822*f*.

The pair of side plates 822*a* extend in the up/down direction and the forward/backward direction, and are arranged opposite each other in the left/right direction. The front upper plate 822*b* connects an area between the upper ends of the pair of side plates 822*a* on the front side. The back upper plate 822*c* connects an area between the upper ends of the pair of side plates 822*a* on the back side. The front upper plate 822*b* and the back upper plate 822*c* are separated by a gap in the forward/backward direction.

The relay board 821 is held inside the board holder 822 which is the frame-shaped member formed with the pair of side plates 822*a*, the front upper plate 822*b* and the back upper plate 822*c*. The board connector portion 821*c* projects upward from the gap between the front upper plate 822*b* and the back upper plate 822*c*.

The locating pin 822*d* is arranged behind (on the back side of) the board connector portion 821*c* in the longitudinal direction (forward/backward direction) of the development device 40. The locating pin 822*d* is cylindrical, is provided on the upper surface of the back upper plate 822*c* and projects upward. The locating pin 822*d* is inserted into the locating hole 55 to be fitted thereinto.

The rotation restriction pin 822*e* is arranged in front of (on the front side of) the board connector portion 821*c* in the longitudinal direction (forward/backward direction) of the development device 40. The rotation restriction pin 822*e* is formed in the shape of, for example, a projection having a cross shape in cross section, is provided on the upper surface of the front upper plate 822*b* and projects upward. The rotation restriction pin 822*e* is inserted into the rotation restriction hole 56 to be fitted thereinto.

The locating pin 822*d* and the locating hole 55 are provided to locate the sensor connector portion 46*c* and the board connector portion 821*c*. Hence, the locating pin 822*d* and the locating hole 55 are preferably circular in cross section to be fitted together.

The rotation restriction pin 822*e* and the rotation restriction hole 56 are arranged away from the locating pin 822*d* and the locating hole 55 in the longitudinal direction (forward/backward direction) of the development device 40. In this way, it is possible to restrict the rotation of the sensor connector portion 46*c* and the board connector portion 821*c* around the axis of the locating pin 822*d* and the locating hole 55. Therefore, the rotation restriction pin 822*e* and the rotation restriction hole 56 preferably have shapes which can restrict displacements thereof in the left/right direction.

The pair of coupling shafts 822*f* are provided in the pair of side plates 822*a*. The pair of coupling shafts 822*f* project toward both outer sides of the pair of side plates 822*a*, and extend horizontally in the left/right direction. The pair of coupling shafts 822*f* are inserted into a pair of guide grooves 853 in the holder support portion 85 which will be described later.

The holder support portion 85 is provided in the slide member 82. The holder support portion 85 includes a base portion 851, a pair of guide walls 852 and the pair of guide grooves 853.

The base portions 851 are arranged in two locations spaced apart in the forward/backward direction. The base portion 851 is substantially in the shape of a rectangular parallelepiped, and includes a flat upper surface and an inclined surface at the back thereof which is inclined upward from the back side toward the front side.

The pair of guide walls 852 are located between the base portions 851 in the two locations in the forward/backward direction, and are arranged on both outer sides of the base portions 851 in the left/right direction. The pair of guide walls 852 extend in the up/down direction and the forward/backward direction, and are arranged opposite each other in the left/right direction. The distance between the pair of guide walls 852 is longer than the width of the board holder 822. The board holder 822 is arranged between the pair of guide walls 852.

The pair of guide grooves 853 are formed in the pair of guide walls 852 to penetrate the guide walls 852 in the left/right direction, and extend in the forward/backward direction. Each of the pair of guide grooves 853 includes a horizontal portion which is parallel to the upper surface of the base portion 851 and an inclined portion which is inclined downward from the back end of the horizontal portion toward the back side. The angle of the inclined portion of the guide grooves 853 with respect to the horizontal direction is the same as that of the inclined surface of the base portion 851 with respect to the horizontal direction.

The pair of coupling shafts 822*f* of the board holder 822 are inserted into the pair of guide grooves 853. In this way, the holder support portion 85 moveably supports the board holder 822 in the forward/backward direction.

Figure 14:
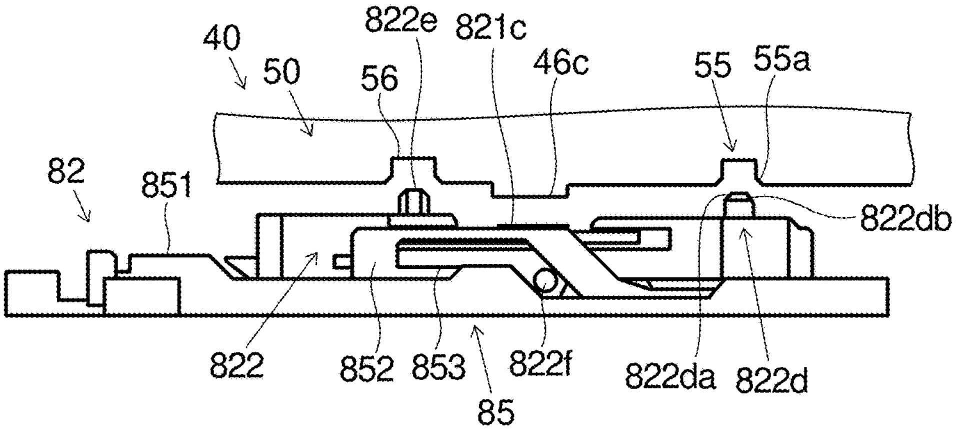
FIG. 14 is a side view of an area around the holder support portion in FIG. 11, and shows a state where the slide member is located in a support position.
Figure 15:
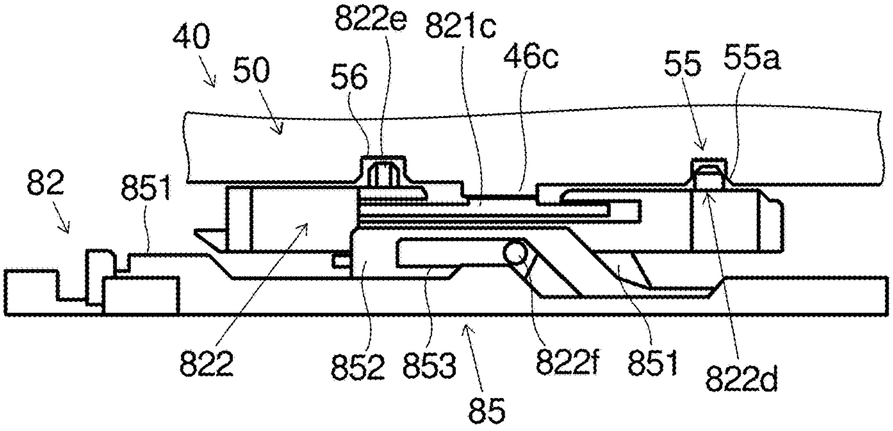
FIG. 15 is a side view of the area around the holder support portion in FIG. 11, and shows a state where the slide member has been moved from the state in FIG. 14 to a front side.
Figure 16:
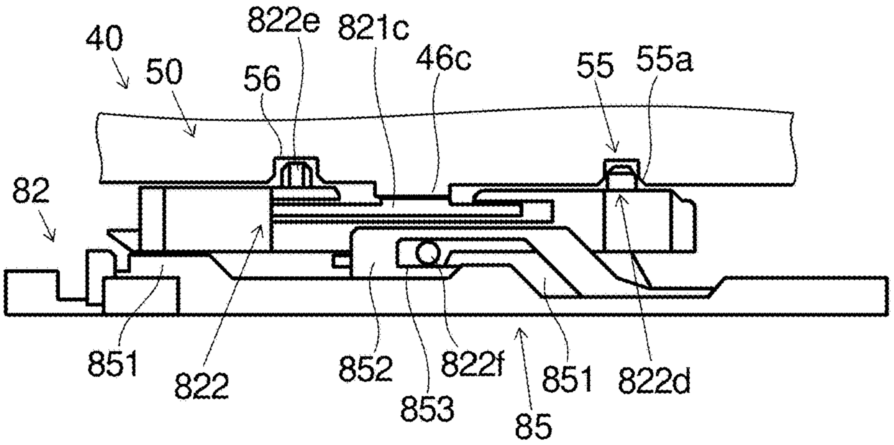
FIG. 16 is a side view of the area around the holder support portion in FIG. 11, and shows a state where the slide member has been moved from the state in FIG. 15 to the front side and then to a separation position.

The operation of connection of the sensor connector portion 46*c* of the density sensor 46 and the board connector portion 821*c* of the relay board 821 will then be described. FIG. 14 is a side view of an area around the holder support portion 85 in FIG. 11, and shows a state where the slide member 82 is located in a separation position. FIG. 15 is a side view of the area around the holder support portion 85 in FIG. 11, and shows a state where the slide member 82 has been moved from the state in FIG. 14 to the back side. FIG. 16 is a side view of the area around the holder support portion 85 in FIG. 11, and shows a state where the slide member 82 has been moved from the state in FIG. 15 to the back side and then to the support position. In FIGS. 14 to 16, the left side is the front (front side) of the development device 40 and the slide member 82, and the right side is the back (back side) of the development device 40 and the slide member 82.

In a state where the open/close cover 2*c* is opened, as shown in FIG. 14, the slide member 82 is located on the front (left side in FIG. 14), the pair of coupling shafts 822*f* of the board holder 822 are located in the rearmost position (right side in FIG. 14) of the pair of guide grooves 853 of the holder support portion 85. The relay board 821 and the board holder 822 are located below and away from the development device 40. In other words, the slide member 82 is arranged in the separation position in which the slide member 82 is located away from the development device 40.

Here, by the approach/separation mechanism 80, the development device 40 is arranged in the retraction position in which the development roller 44 is located away from the photosensitive drum 21. In other words, in the state where the open/close cover 2*c* is opened, the approach/separation mechanism 80 moves the slide member 82 to the separation position in which the slide member 82 is located away from the development device 40.

When the open/close cover 2*c* is closed to a predetermined position, as shown in FIG. 15, the slide member 82 is moved backward of the position shown in FIG. 14, and thus the pair of coupling shafts 822*f* moves up the inclined portion of the pair of guide grooves 853, with the result that the board holder 822 rides on the base portion 851 on the back side. The board connector portion 821*c* is electrically connected to the sensor connector portion 46*c*. The locating pin 822*d* is inserted into the locating hole 55 to be fitted thereinto. The rotation restriction pin 822*e* is inserted into the rotation restriction hole 56 to be fitted thereinto. In this way, the relay board 821 and the board holder 822 are connected to the lower surface of the development device 40.

When the open/close cover 2*c* is further closed, as shown in FIG. 16, the slide member 82 is moved backward of the position shown in FIG. 15, and thus the pair of coupling shafts 822*f* move on the horizontal portions of the pair of guide grooves 853, with the result that the board holder 822 rides on the base portion 851 on the front side. In a state where the board connector portion 821*c* and the sensor connector portion 46*c* are electrically connected, the relay board 821 is held below the lower surface of the development container 50. The slide member 82 is arranged in the support position in which the slide member 82 is located close to the development device 40.

Here, by the approach/separation mechanism 80, the development device 40 is arranged in the development position in which the development roller 44 is located close to the photosensitive drum 21. In other words, the open/close cover 2*c* is closed, and thus the approach/separation mechanism 80 moves the slide member 82 to the support position in which the slide member 82 is located close to the development device 40.

When the open/close cover 2*c* in the closed state is opened, an operation reverse to the operation described with reference to FIGS. 14 to 16 is performed. In this way, the slide member 82 arranged in the support position is moved to the separation position, and thus the electrical connection of the sensor connector portion 46*c* and the board connector portion 821*c* is released.

As described above, the approach/separation mechanism 80 moves the slide member 82 to the support position in which the slide member 82 is located close to the development device 40 and to the separation position in which the slide member 82 is located away from the development device 40 while moving the slide member 82 in the longitudinal direction (forward/backward direction) of the development device 40.

In other words, the approach/separation mechanism 80 locates the development roller 44 close to the photosensitive drum 21 when the slide member 82 is arranged in the support position, and locates the development roller 44 away from the photosensitive drum 21 when the slide member 82 is arranged in the separation position. In the configuration described above, it is possible to simultaneously perform the support of the development device 40 using the slide member 82 and the arrangement of the development device 40 in the development position. It is also possible to simultaneously perform the location of the development device 40 away from the development device 40 and the arrangement of the development device 40 in the retraction position. In this way, it is possible to efficiently fit and remove the development device 40, and thus it is possible to reduce the number of components and the costs.

Figure 17:
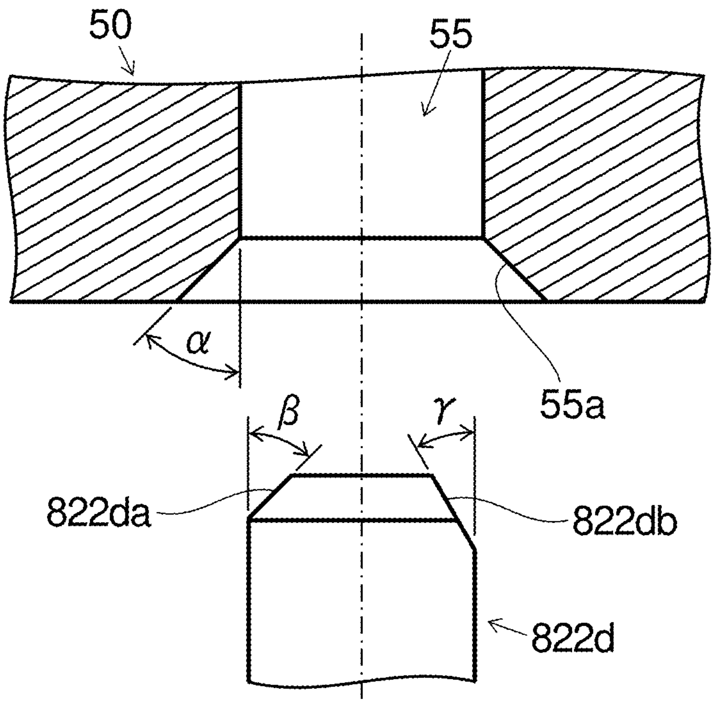
FIG. 17 is a partial cross-sectional side view of a connection portion in FIG. 14.
Figure 18:
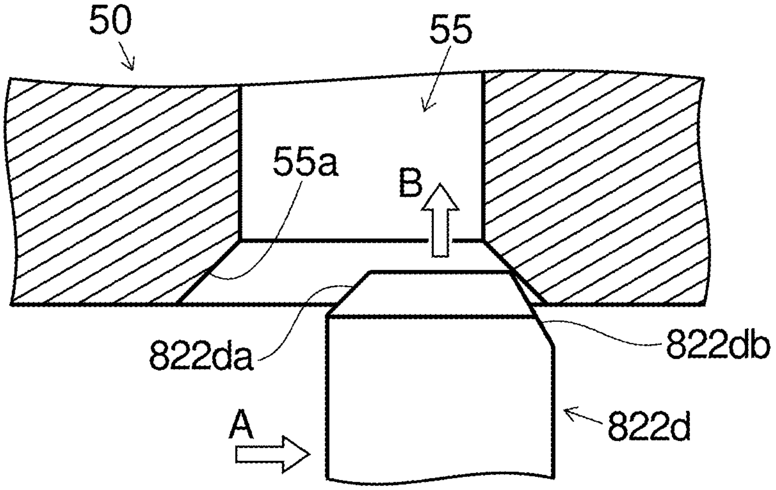
FIG. 18 is a partial cross-sectional side view of the connection portion in FIG. 17, and shows a state where a locating pin is inserted into a locating hole.

The details of the connection portion 24 of the density sensor 46 and the relay board 821 will then be described. FIG. 17 is a partial cross-sectional side view of the connection portion 24 in FIG. 14. FIG. 18 is a partial cross-sectional side view of the connection portion 24 in FIG. 17, and shows a state where the locating pin 822*d* is inserted into the locating hole 55.

The locating hole 55 includes an opening inclined portion 55*a*. The opening inclined portion 55*a* is a lower end of the locating hole 55, and is provided in an opening end portion. The opening inclined portion 55*a* is formed in an annular shape along the circumferential direction of the cylindrical locating hole 55. The opening inclined portion 55*a* is inclined with respect to the axial direction (up/down direction in FIGS. 17 and 18) of the locating hole 55. For example, the opening inclined portion 55*a* has an inclination angle $\alpha$ of 45 degrees with respect to the axial direction of the locating hole 55.

The locating pin 822*d* includes a tip inclined portion 822*da* and a locating inclined portion 822*db*.

The tip inclined portion 822*da* is an upper end of the locating pin 822*d*, and is provided in a tip portion. The tip inclined portion 822*da* is formed substantially in an annular shape along the circumferential direction of the cylindrical locating pin 822*d*. The tip inclined portion 822*da* is inclined with respect to the axial direction (up/down direction in FIGS. 17 and 18) of the locating pin 822*d*. For example, the tip inclined portion 822*da* has an inclination angle $\beta$ of 45 degrees with respect to the axial direction of the locating pin 822*d*.

The locating inclined portion 822*db* is continuous in the circumferential direction of the tip inclined portion 822*da*, and is formed in a part in the circumferential direction. Specifically, the locating inclined portion 822*db* is arranged opposite the opening inclined portion 55*a* in the longitudinal direction (the forward/backward direction, the left/right direction in FIGS. 17 and 18) of the development device 40. The locating inclined portion 822*db* faces the direction in which the slide member 82 is moved from the separation position toward the support position, that is, the backward direction (rightward direction in FIGS. 17 and 18) in the longitudinal direction (forward/backward direction) of the development device 40. The locating inclined portion 822*db* has a smaller inclination angle γ with respect to the axial direction of the locating pin 822*d* than the tip inclined portion 822*da* (inclination angle β) (γ<β).

In the configuration described above, the locating pin 822*d* and the locating hole 55 include the tip inclined portion 822*da* and the opening inclined portion 55*a*, respectively, and thus the locating pin 822*d* and the locating hole 55 are easily fitted together when approaching each other. Furthermore, since the locating pin 822*d* includes the locating inclined portion 822*db*, when the development device 40 is moved in the longitudinal direction (direction indicated by an arrow A shown in FIG. 18) of the development device 40, the locating inclined portion 822*db* having the smaller inclination angle makes contact with the opening inclined portion 55*a*, and thus the locating pin 822*d* easily enters the locating hole 55 (direction indicated by an arrow B shown in FIG. 18). Hence, in the maintenance and the replacement of the development device 40, the development device 40 can be smoothly fitted and removed.

In the configuration described above, for example, the opening inclined portion 55*a* has the inclination angle α of 45 degrees, the tip inclined portion 822*da* has the inclination angle β of 45 degrees and thus it is possible to cause the locating pin 822*d* to easily enter the locating hole 55. Since the locating inclined portion 822*db* has the inclination angle γ smaller than 45 degrees, it is possible to enhance the effect of the movement of the locating pin 822*d* toward a center portion in the radial direction of the locating hole 55 when the locating inclined portion 822*db* makes contact with the opening inclined portion 55*a*. Hence, the locating pin 822*d* easily enters the locating hole 55, and thus it is possible to enhance the accuracy of the connection of the board connector portion 821*c* and the sensor connector portion 46*c*.

In the configuration described above, the connection portion 24 of the density sensor 46 and the relay board 821 is arranged between the locating pin 822*d* and the locating hole 55 and the rotation restriction pin 822*e* and the rotation restriction hole 56 in the longitudinal direction (forward/backward direction) of the development device 40. In the configuration described above, it is possible to enhance the accuracy of locating the connection portion 24, that is, the board connector portion 821*c* and the sensor connector portion 46*c* in the forward/backward direction and the left/right direction. Hence, it is possible to suitably perform the energization and the signal communication on the density sensor 46.

As described with reference to FIGS. 15 and 16, the locating pin 822*d* and the locating hole 55 are fitted together before the slide member 82 has been moved to the support position in which the slide member 82 is located close to the development device 40, and the fitting is released before the slide member 82 has been moved to the separation position in which the slide member 82 is located away from the development device 40. In the configuration described above, the board connector portion 821*c* and the sensor connector portion 46*c* are located before the connection of the board connector portion 821*c* and the sensor connector portion 46*c* has been completed. Hence, it is possible to enhance the accuracy of the electrical connection of the board connector portion 821*c* and the sensor connector portion 46*c*.

Although the embodiment of the present disclosure has been described above, the present disclosure is not limited to the embodiment, and various changes can be performed without departing from the spirit of the disclosure.

For example, although in the embodiment described above, the image forming apparatus 1 is the so-called tandem type image forming apparatus for color printing which sequentially superimposes images of a plurality of colors to form an image, the present disclosure is not limited to this type of apparatus. The image forming apparatus may be an image forming apparatus for color printing which is not the tandem type or an image forming apparatus for monochrome printing.

What is claimed is:

1. An image forming apparatus comprising:

an image carrying member in which an electrostatic latent image is formed on an outer circumferential surface;

a development device that includes a developer carrying member which supplies a toner to the electrostatic latent image to form a toner image;

a slide member that is capable of reciprocating in a longitudinal direction of the development device and removably supports the development device;

an approach/separation mechanism that moves the slide member to a support position in which the slide member is located close to the development device and to a separation position in which the slide member is located away from the development device while moving the slide member in the longitudinal direction of the development device;

a density sensor that is provided in the development device to detect a density of the toner in the development device; and a relay board that is provided in the slide member and is electrically connectable to the density sensor, wherein each of the development device and the slide member includes one of a locating pin and a locating hole that are fitted together when the development device and the slide member approach each other, the locating hole includes an opening inclined portion that is provided in an opening end portion and is inclined with respect to an axial direction of the locating hole and the locating pin includes:

a tip inclined portion that is provided in a tip portion and is inclined with respect to an axial direction of the locating pin; and a locating inclined portion that is continuous in a circumferential direction of the tip inclined portion, is arranged opposite the opening inclined portion in the longitudinal direction of the development device and has a smaller inclination angle with respect to the axial direction than the tip inclined portion.

2. The image forming apparatus according to claim 1, wherein the opening inclined portion has an inclination angle of 45 degrees with respect to the axial direction of the locating hole, the tip inclined portion has an inclination angle of 45 degrees with respect to the axial direction of the locating pin and the locating inclined portion has the inclination angle that is smaller than 45 degrees with respect to the axial direction of the locating pin.

3. The image forming apparatus according to claim 1, wherein the development device and the slide member are arranged away from the locating pin and the locating hole in the longitudinal direction of the development device, and each of the development device and the slide member includes one of a rotation restriction pin and a rotation restriction hole that are fitted together when the development device and the slide member approach each other.

4. The image forming apparatus according to claim 3, wherein a connection portion of the density sensor and the relay board is arranged between the locating pin and the locating hole and the rotation restriction pin and the rotation restriction hole in the longitudinal direction of the development device.

5. The image forming apparatus according to claim 1, wherein when the approach/separation mechanism arranges the slide member in the support position, the approach/separation mechanism locates the developer carrying member close to the image carrying member, and when the approach/separation mechanism arranges the slide member in the separation position, the approach/separation mechanism locates the developer carrying member away from the image carrying member.

6. The image forming apparatus according to claim 1, wherein the locating pin and the locating hole are fitted together before the slide member has been moved to the support position, and the fitting of the locating pin and the locating hole is released before the slide member has been moved to the separation position.

* * * * *